US012789811B2

(12) United States Patent
Kim et al.

(10) Patent No.: US 12,789,811 B2
(45) Date of Patent: Nov. 10, 2026

(54) GENERATING TRANSITION PATH CONNECTING A DRIVING PATH AND A CANDIDATE DRIVING PATH FOR AUTONOMOUS VEHICLE

(71) Applicants: Hyundai Motor Company, Seoul (KR); Kia Corporation, Seoul (KR)

(72) Inventors: Yoo Suk Kim, Seoul (KR); Beom Jun Kim, Seoul (KR); Heung Seok Chae, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 79 days.

(21) Appl. No.: 18/517,563

(22) Filed: Nov. 22, 2023

(65) Prior Publication Data

US 2024/0425051 A1 Dec. 26, 2024

(30) Foreign Application Priority Data

Jun. 22, 2023 (KR) ........................ 10-2023-0080496

(51) Int. Cl.

| | |
|---|---|
| ***G01C 21/34*** | (2006.01) |
| ***B60W 30/18*** | (2012.01) |
| ***B60W 40/072*** | (2012.01) |
| ***B60W 40/105*** | (2012.01) |
| ***B60W 40/109*** | (2012.01) |
| ***B60W 60/00*** | (2020.01) |

(52) U.S. Cl.

CPC .... *B60W 30/18163* (2013.01); *B60W 40/072* (2013.01); *B60W 40/105* (2013.01); *B60W 40/109* (2013.01); *B60W 60/0013* (2020.02); *B60W 2520/125* (2013.01); *B60W 2552/30* (2020.02); *B60W 2552/53* (2020.02); *B60W 2556/40* (2020.02); *G01C 21/3446* (2013.01)

(58) Field of Classification Search

CPC .......... G01D 21/3492; G01D 21/3697; B60W 30/18163; B60W 30/0013; B60W 40/072; B60W 40/105; B60W 40/109; B60W 2552/53; B60W 2552/30; B60W 2556/40; B60W 2520/125

See application file for complete search history.

(56) References Cited

U.S. PATENT DOCUMENTS 9,581,460 B1 * 2/2017 McNew ............. G01C 21/3605
9,970,780 B2 * 5/2018 Bai ...................... G08G 1/0129
10,843,711 B2 * 11/2020 Takagi ..................... G08G 1/16

(Continued)

*Primary Examiner* — Gonzalo Laguarda
(74) *Attorney, Agent, or Firm* — Banner & Witcoff, Ltd.

(57) ABSTRACT

An apparatus is introduced for autonomous driving of a vehicle. The apparatus may comprise a processor, and memory storing instructions that, when executed by the processor, may cause the apparatus to determine a second path that is different from a first path being used for autonomous driving of the vehicle, determine whether a path transition condition is met, based on a determination that the path transition condition is met and based on a travel distance between the first path and the second path, determine a convergent longitudinal distance within which a path transition from the first path to the second path is to be completed, generate, based on the determined convergent longitudinal distance, a transition path connecting the first path with the second path, and may cause the vehicle to drive autonomously along the transition path.

19 Claims, 10 Drawing Sheets

(56) References Cited

U.S. PATENT DOCUMENTS

| | | | | |
|---|---|---|---|---|
| 11,460,311 | B2 * | 10/2022 | Tu | G06V 20/58 |
| 11,474,525 | B2 * | 10/2022 | Sheu | G01S 17/86 |
| 12,124,261 | B2 * | 10/2024 | Li | G05D 1/227 |
| 12,214,803 | B2 * | 2/2025 | Gotou | B60W 60/0013 |
| 12,365,342 | B2 * | 7/2025 | Nimura | G08G 1/096811 |
| 2024/0426621 | A1 * | 12/2024 | Couleaud | G06Q 30/0265 |

* cited by examiner

GENERATING TRANSITION PATH CONNECTING A DRIVING PATH AND A CANDIDATE DRIVING PATH FOR AUTONOMOUS VEHICLE

CROSS-REFERENCE TO RELATED APPLICATION

This application claims the benefit of priority to Korean Patent Application No. 10-2023-0080496, filed in the Korean Intellectual Property Office on Jun. 22, 2023, the entire contents of which are incorporated herein by reference.

TECHNICAL FIELD

The present disclosure relates to a vehicle control apparatus, a vehicle apparatus including the same, and a method thereof.

BACKGROUND

An autonomous driving technology of a vehicle apparatus may be applied in various forms. The vehicle apparatus may determine an autonomous driving path in various manners and may drive along the determined path. For example, the vehicle apparatus may determine a path based on image recognition using a camera or a path based on a high definition map and may drive along the determined autonomous driving path.

If the vehicle apparatus drives using only one path in an autonomous driving process, it may be unable to effectively cope with a change in surrounding situation. Thus, there may be a need to continuously calculate an optimal path during autonomous driving and change to the calculated path. A sudden change in path during autonomous driving may cause discomfort or apprehension to a passenger in the vehicle apparatus. Thus, when the path is changed during autonomous driving, there is a need to stably or gradually change the path such that the passenger does not feel uncomfortable.

SUMMARY

The present disclosure has been made to solve the above-mentioned problems.

According to the present disclosure, an apparatus for autonomous driving of a vehicle, the apparatus may comprise: a processor; and memory storing instructions that, when executed by the processor, may cause the apparatus to: determine a second path that is different from a first path being used for autonomous driving of the vehicle; determine whether a path transition condition is met, based on a determination that the path transition condition is met and based on a travel distance between the first path and the second path, determine a convergent longitudinal distance within which a path transition from the first path to the second path is to be completed; generate, based on the determined convergent longitudinal distance, a transition path connecting the first path with the second path; and may cause the vehicle to drive autonomously along the transition path.

The apparatus, wherein the path transition condition is met when a type of the first path and a type of the second path are different from each other. The apparatus, wherein the instructions, when executed by the processor, may cause the apparatus to determine a type of the first path or a type of the second path based on at least one of a high definition map, a forward line, a side line, or a road boundary.

The apparatus, wherein the path transition condition is met based on a determination that the travel distance is greater than or equal to a value. The apparatus, wherein the travel distance is a longitudinal distance between the first path and the second path.

The apparatus, wherein the instructions, when executed by the processor, may cause the apparatus to: calculate longitudinal distances between the first path and the second path at a plurality of points of the second path; and determine a maximum value among the longitudinal distances as the travel distance.

The apparatus, wherein the instructions, when executed by the processor, may cause the apparatus to calculate the longitudinal distances at: a first point of the second path, the first point corresponding to a location of the vehicle on the first path; a second point prior to the first point; and a third point subsequent to the first point.

The apparatus, wherein the instructions, when executed by the processor, may cause the apparatus to: calculate a time required to change from the first path to the second path based on the travel distance; and multiply the time by a longitudinal speed of the vehicle to determine the convergent longitudinal distance.

The apparatus, wherein the instructions, when executed by the processor, may cause the apparatus to calculate the time based on a determination that a curvature associated with the travel distance is in a bang-bang form. The apparatus, wherein the instructions, when executed by the processor, may cause the apparatus to calculate the time based on a determination that the vehicle moves at a constant velocity in a path change process.

The apparatus, wherein the instructions, when executed by the processor, may cause the apparatus, based on a lateral acceleration of a specified value or less, to calculate the time. The apparatus, wherein the instructions, when executed by the processor, may cause the apparatus, based on a margin of a specified rate, to calculate the time.

The apparatus, wherein the instructions, when executed by the processor, may cause the apparatus to store information about the transition path in conjunction with the first path and the second path. The apparatus, wherein the instructions, when executed by the processor, may cause the apparatus to: determine the first path in a first period of time; and determine the second path in a second period of time.

According to the present disclosure, a method performed by a processor for autonomous driving of a vehicle, the method may comprise: determining a second path that is different from a first path being used for autonomous driving of the vehicle; determining whether a path transition condition is met; based on a determination that the path transition condition is met and based on a travel distance between the first path and the second path, determining a convergent longitudinal distance within which a path transition from the first path to the second path is to be completed; generating, based on the determined convergent longitudinal distance, a transition path connecting the first path with the second path; and causing the vehicle to drive autonomously along the transition path.

The method may further comprise: storing information about the transition path in conjunction with the first path and the second path. The method may further comprise: determining a type of the first path or a type of the second path based on at least one of a high definition map, a forward line, a side line, or a road boundary.

The method may further comprise: calculating longitudinal distances between the first path and the second path at a plurality of points of the second path; and determining a maximum value among the longitudinal distances as the travel distance.

The method may further comprise: calculating a time required to change from the first path to the second path based on the travel distance; and multiplying the time by a longitudinal speed of the vehicle to determine the convergent longitudinal distance. The method, wherein the calculating the time may comprise calculating the time based on a determination that a curvature associated with the travel distance is in a bang-bang form.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
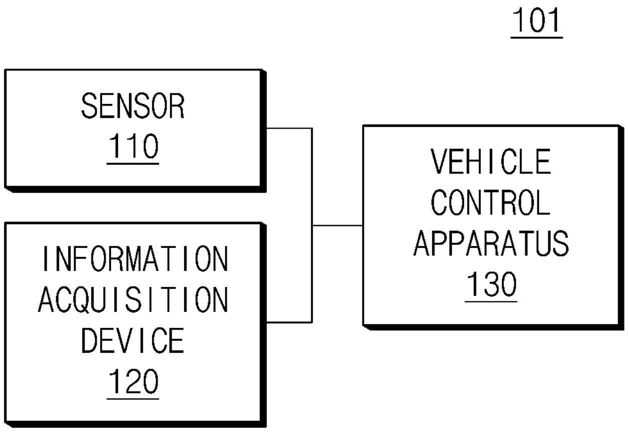
FIG. 1 shows an example of a configuration of a vehicle apparatus according to an example of the present disclosure.

Hereinafter, some examples of the present disclosure will be described in detail with reference to the accompanying drawings. In adding the reference numerals to the components of each drawing, it should be noted that the identical component is designated by the identical numerals even if they are displayed on other drawings. Further, in describing the example of the present disclosure, a detailed description of well-known features or functions will be ruled out in order not to unnecessarily obscure the gist of the present disclosure.

In describing the components of the example according to the present disclosure, terms such as first, second, “A”, “B”, (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, examples of the present disclosure will be described in detail with reference to FIGS. 1 to 10.

FIG. 1 shows an example of a configuration of a vehicle apparatus according to an example of the present disclosure. FIG. 1 illustrates a configuration associated with autonomous driving, but not limited thereto.

Referring to FIG. 1, a vehicle apparatus 101, which may be installed in or mounted on a vehicle, may include a sensor 110, an information acquisition device 120, and a vehicle control apparatus 130.

The sensor 110 may detect an object around the vehicle apparatus 101. In other words, the sensor 110 may detect a distance from an object in front of/behind a vehicle, for example, a preceding/following vehicle, a sign, an obstacle, or the like, a relative speed, or the like. For example, the sensor 110 may include a camera, radio detection and ranging (RADAR), or light detection and ranging (LiDAR). Furthermore, the sensor 110 may include state information of various actuators of the vehicle. For example, the state information of the actuator of the vehicle may include a direction, a speed, acceleration, an angular speed, or the like of the vehicle.

The information acquisition device 120 may obtain information associated with autonomous driving, for example, location information and map information of the vehicle. For example, the information acquisition device 120 may obtain current location information of the vehicle by means of a global positioning system (GPS) and may obtain high definition map information such as a curvature of a road where the vehicle is traveling or a current line location of the vehicle. In this case, the information acquisition device 120 may store map information in separate storage (not shown) and may receive location information or map information of the vehicle from an external server through a communication device (not shown).

The vehicle control apparatus 130 may determine a path for autonomous driving of the vehicle apparatus 101. For example, the vehicle control apparatus 130 may determine a driving path for autonomous driving based on at least one of a high definition map, a forward line, a side line, or a road boundary.

The vehicle control apparatus 130 may determine an autonomous driving path using a scheme (or type) with the highest reliability depending on a specified period and may allow the vehicle apparatus 101 to move along the determined driving path. For example, the vehicle control apparatus 130 may determine a first path based on the high definition map in a first period. Thereafter, the vehicle control apparatus 130 may determine a second path based on the forward line in a second period.

If it is determined that the second path is an optimal path while the vehicle apparatus 101 is driving along the first path, the vehicle control apparatus 130 may determine whether to transition a path. When transitioning the path, the vehicle control apparatus 130 may determine a convergent longitudinal distance at a level where a passenger does not feel uncomfortable. The vehicle control apparatus 130 may generate a transition path connecting between the first path and the second path based on the determined convergent longitudinal distance. The vehicle control apparatus 130 may allow the vehicle apparatus 101 to drive along the transition path to change the autonomous driving path. A description will be given in detail below of a detailed function of the vehicle control apparatus 130 with reference to FIG. 2.

Figure 2:
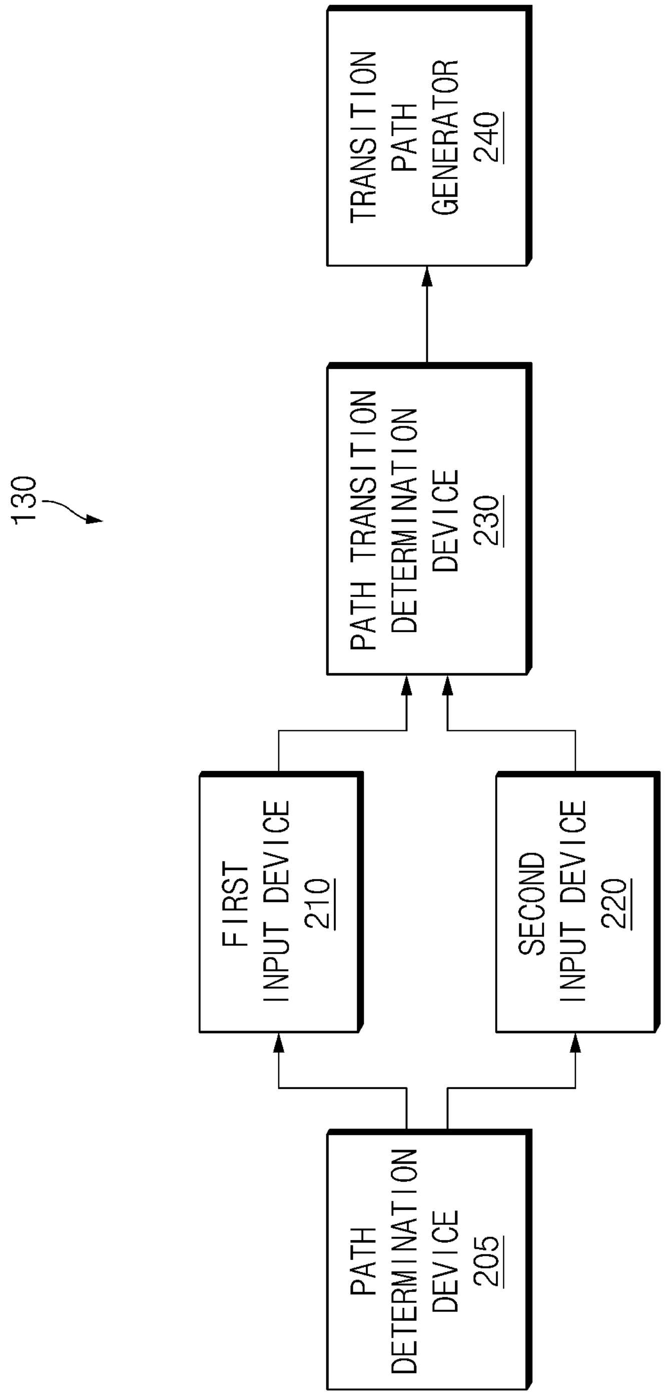
FIG. 2 shows an example of a configuration of a vehicle control apparatus according to an example of the present disclosure.

FIG. 2 shows an example of a configuration of a vehicle control apparatus according to an example of the present disclosure.

Referring to FIG. 2, a vehicle control apparatus 130 may include a path determination device 205, a first input device 210, a second input device 220, a path transition determination device 230, and a transition path generator 240.

The path determination device 205 may determine a driving path of a vehicle apparatus 101 in various manners depending on a specified determination period. For example, the path determination device 205 may determine a driving path based on at least one of a high definition map, a forward line, a side line, or a road boundary.

The path determination device 205 may determine reliability for each type (e.g., a map type, a forward line type, a side line type, or a road boundary type) associated with determination of autonomous driving at the specified determination period. The reliability may be a value determined by comprehensively reflecting a driving state, arrangement of surrounding objects, or the like. The path determination device 205 may determine and transmit an autonomous driving path of a type with the highest reliability to the first input device 210 and the second input device 220 at each determination period.

The first input device (or a path type input device) 210 may receive information about the path determined as the optimal path by the path determination device 205 at the specified determination period. The first input device 210 may transmit type information of a previous path and type information of a current path to the path transition determination device 230.

The second input device (or a path movement amount input device) 220 may receive information about the path determined as the optimal path by the path determination device 205 at the specified determination period. The second input device 220 may calculate an amount of path movement between the previous path and the current path (or a longitudinal distance between paths or a lateral distance between paths). The amount of path movement may be the longitudinal distance between the first path and the second path. The second input device 220 may calculate the largest value among the longitudinal distances between the first path and the second path as the amount of path movement. The second input device 220 may transmit the calculated amount of path movement to the path transition determination device 230.

The path transition determination device 230 may receive information about the first path in a previous period (e.g., type information of the first path) and information about the second path in a current period (type information of the second path) from the first input device 210. The path transition determination device 230 may receive the amount of path movement from the second input device 220.

The path transition determination device 230 may identify whether a path transition condition is met based on the received information. The path transition condition may be a condition indicating a state where a path transition is desirable, which may be met if the first path and the second path have different types or if the amount of path movement is greater than or equal to a specified reference value (e.g., 0.1 m).

If the path transition condition is met, the path transition determination device 230 may calculate a convergent longitudinal distance for changing from the first path to the second path. The convergent longitudinal distance may be determined as a level where a passenger does not feel uncomfortable or discomfort. The path transition determination device 230 may transmit the calculated convergent longitudinal distance to the transition path generator 240. Additional information about the calculation of the convergent longitudinal distance will be provided with reference to FIGS. 3 to 8.

The transition path generator 240 may generate a transition path between the first path and the second path based on the received convergent longitudinal distance. The vehicle apparatus 101 may drive along the generated transition path to change from the first path to the second path.

Figure 3:
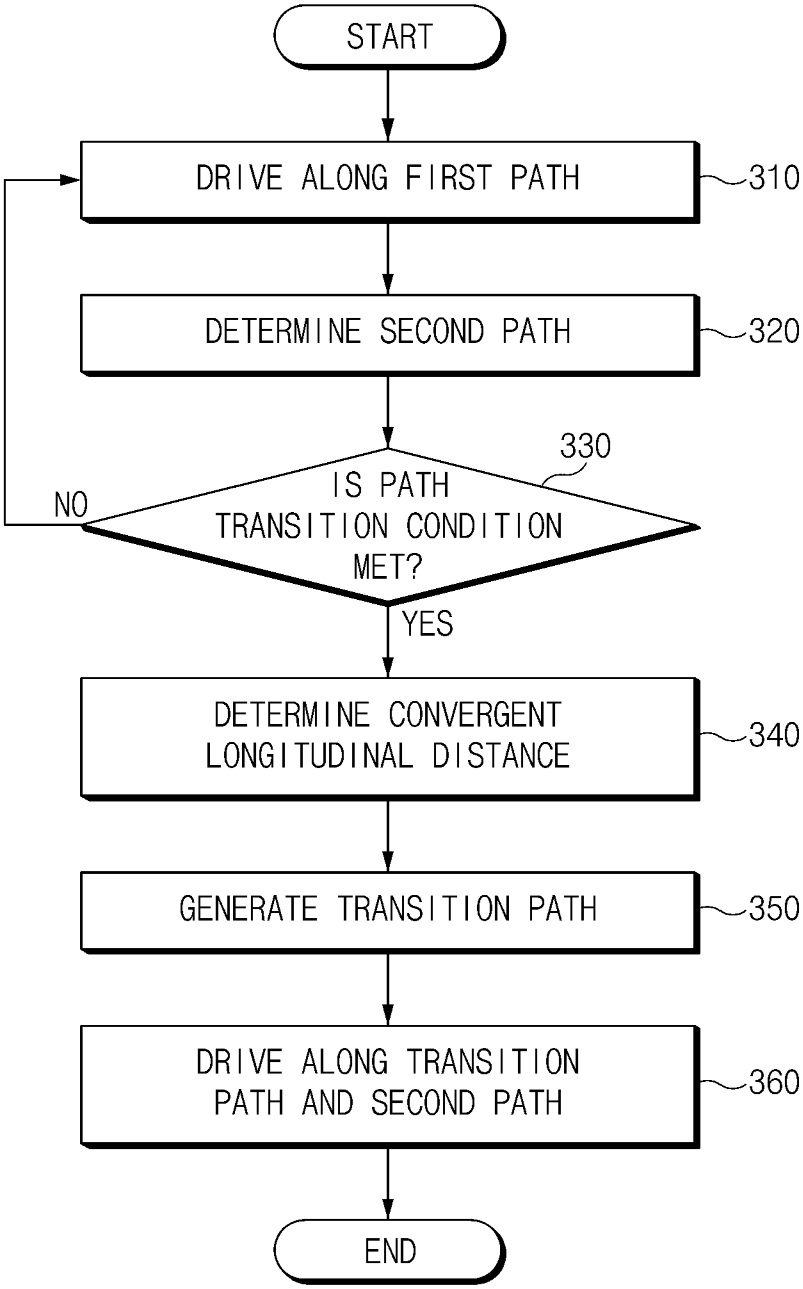
FIG. 3 shows an example of an autonomous driving control method according to an example.

FIG. 3 shows an example of an autonomous driving control method according to an example.

Referring to FIG. 3, in operation 310, a vehicle apparatus 101 may drive along a first path. The first path may be a path determined as an optimal path in a previous determination period.

In operation 320, the vehicle apparatus 101 may determine a second path. The second path may be a path determined as an optimal path in a current determination period.

In operation 330, the vehicle apparatus 101 may identify whether a path transition condition is met. The path transition condition may be a condition for determining whether a change from the first path to the second path is to occur.

According to an example, the path transition condition may be met if the type of the first path and the type of the second path are different from each other. For example, if the first path is a path (or a map type) determined based on a high definition map and if the second path is a path (or a forward line type) determined based on a forward line (e.g., a lane that is directly in front of a vehicle), the vehicle apparatus 101 may determine that the path transition condition is met.

According to an example, the path transition condition may be met if the amount of path movement (or the maximum amount of movement) is greater than or equal to a specified reference value. For example, the amount of path movement may be a maximum value among the longitudinal distances of the first path and the second path. If the amount of path movement is greater than or equal to the specified reference value (e.g., 0.1 m), the vehicle apparatus 101 may determine that the path transition condition is met.

If the path transition condition is not met (operation 330—NO), the vehicle apparatus 101 may determine that the path is not to be changed and the vehicle may continue driving along the existing first path.

In operation 340, the vehicle apparatus 101 may determine a convergent longitudinal distance at a level where a passenger does not feel uncomfortable based on the amount of path movement (or the maximum amount of movement). If the convergent longitudinal distance becomes short, discomfort the passenger feels may increase. If the convergent longitudinal distance becomes short, discomfort the passenger feels may decrease, but driving stability may be degraded.

According to an example, the vehicle apparatus 101 may determine a convergent longitudinal distance by means of Equation 1 below, which reflects the amount of path movement (or the maximum amount of movement) and a longitudinal speed of the vehicle apparatus 101.

$$\text{Convergent longitudinal distance} = 3 \times \sqrt{10n} \times Vs \qquad \text{[Equation 1]}$$

n: the amount of path movement (or the maximum amount of movement)

Vs: the longitudinal speed of the vehicle apparatus

In operation 350, the vehicle apparatus 101 may generate a transition path connecting between the first path and the second path based on the determined convergent longitudinal distance. The transition path may be determined by reflecting the convergent longitudinal distance.

In operation 360, the vehicle apparatus 101 may drive along the generated transition path and the second path. In the transition process, the vehicle apparatus 101 may maintain a stable driving state such that the passenger does not feel uncomfortable.

Figure 4:
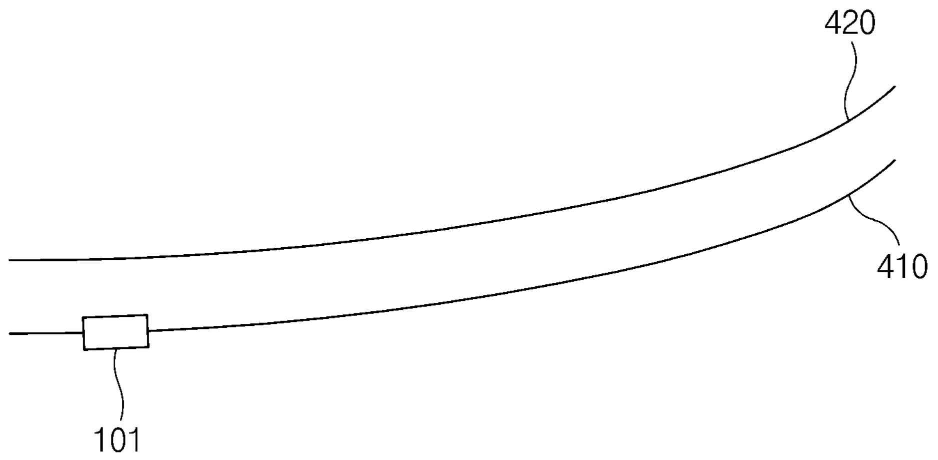
FIG. 4 shows an example of determining a path type according to an example.

FIG. 4 shows an example of determining a path type according to an example.

Referring to FIGS. 2 and 4, a path determination device 205 of a vehicle apparatus 101 may determine a driving path of the vehicle apparatus 101 in various manners depending on a specified determination period. For example, the path determination device 205 may determine a driving path based on at least one of a high definition map, a forward line, a side line, or a road boundary.

According to an example, the path determination device 205 may determine reliability for each type (e.g., a map type, a forward line type, a side line type, or a road boundary type) associated with determination of autonomous driving at the specified determination period. The reliability may be a value determined by comprehensively reflecting a driving state, arrangement of surrounding objects, or the like. The path determination device 205 may determine and transmit an autonomous driving path of a type with the highest reliability to a first input device 210 and a second input device 220 at each determination period.

In a first period, the path determination device 205 may determine a first path (or an optimal path) 410 with the highest reliability. For example, the first path 410 may be a high definition map-based path (or a map type). The vehicle apparatus 101 may drive along the first path 410. The path determination device 205 may transmit information about the first path 410 (hereinafter referred to as "first path information") to the first input device 210 and the second input device 220. The first input device 210 and the second input device 220 may store the first path information.

In a second period subsequent to the first period, the vehicle apparatus 101 may be driving along the first path 410. In the second period, the path determination device 205 may determine a second path 420 with the highest reliability. For example, the second path 420 may be a road boundary-based path (or a road boundary type). The path determination device 205 may transmit information about the second path 420 (hereinafter referred to as "second path information") to the first input device 210 and the second input device 220.

In the state where the first input device 210 stores the first path information, the first input device 210 may receive the second path information. The first input device 210 may transmit type information (e.g., a map type) of the first path 410 and type information (e.g., a road boundary type) of the second path 420 to a path transition determination device 230.

In the state where the second input device 220 stores the first path information, the second input device 220 may receive the second path information. The second input device 220 may calculate a maximum amount of movement based on the first path information and the second path information (refer to FIG. 5). The second input device 220 may transmit the calculated maximum amount of movement to the path transition determination device 230.

The path transition determination device 230 may determine whether to transition a path based on the type information of the first path 410, the type information of the second path 420, and the maximum amount of movement. Hereinafter, a description will be given of the case where the second path 420 is determined as an optimal path in the second period (or a current period), while the vehicle apparatus 101 is driving along the first path 410 as the first path 410 is determined as the optimal path in the first period (or a previous period).

Figure 5:
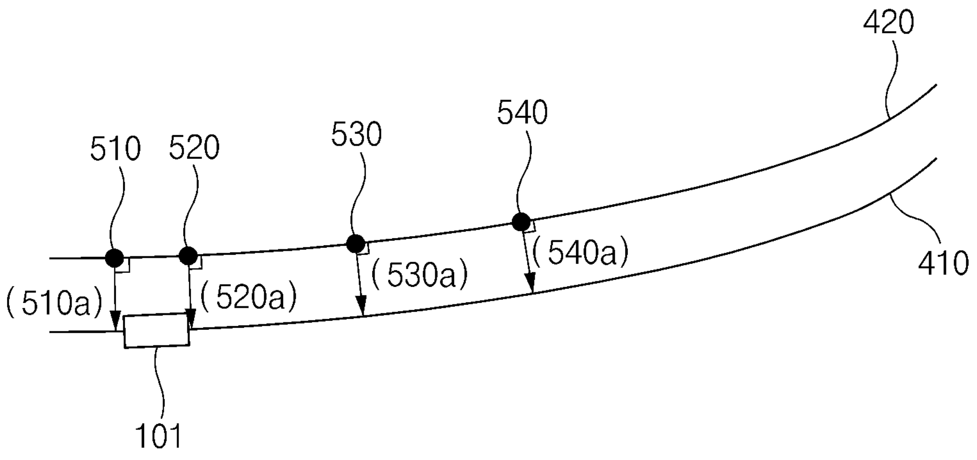
FIG. 5 shows an example of calculating an amount of path movement according to an example.

FIG. 5 shows an example of calculating an amount of path movement according to an example.

Referring to FIGS. 2 and 5, in a first period, a second input device 220 may receive first path information about a first path 410 from a path determination device 205. The second input device 220 may store the first path information. In a second period subsequent to the first period, the second input device 220 may receive second path information about a second path 420 from the path determination device 205.

The second input device 220 may calculate an amount of path movement between the first path 410 and the second path 420 based on the first path information and the second path information. The amount of path movement may be a distance to a point where a line drawn in a vertical direction from one point of the second path 420 (e.g., a point corresponding to a current location of the vehicle apparatus 101) meets the first path 410.

According to an example, the second input device 220 may respectively calculate amounts of path movement at a plurality of points of the second path 420 and may determine the largest value among the amounts of path movement as an amount of path movement (or a maximum amount of movement).

For example, the second input device 220 may respectively calculate amounts of movement (or longitudinal distances) at a first point 510 (e.g., −10 m) prior to a point (or a second point 520) corresponding to the current location of the vehicle apparatus 101, the second point 520 (e.g., 0 m) corresponding to the current location of the vehicle apparatus 101, and a third point 530 (e.g., 20 m) and a fourth point 540 (e.g., 40 m) subsequent to the point corresponding to the current location of the vehicle apparatus 101. The second input device 220 may calculate a first amount of movement **510*a* at the first point 510 and may calculate a second amount of movement 520*a* at the second point 520. The second input device 220 may calculate a third amount of movement 530*a* at the third point 530 and may calculate a fourth amount of movement 540*a* at the fourth point 540. The second input device 220 may determine the largest value among the first to fourth amounts of movements 510*a*, 520*a*, 530*a*, and 540*a* as a maximum amount of movement and may transmit the determined maximum amount of movement to a path transition determination device 230**.

Figure 6:
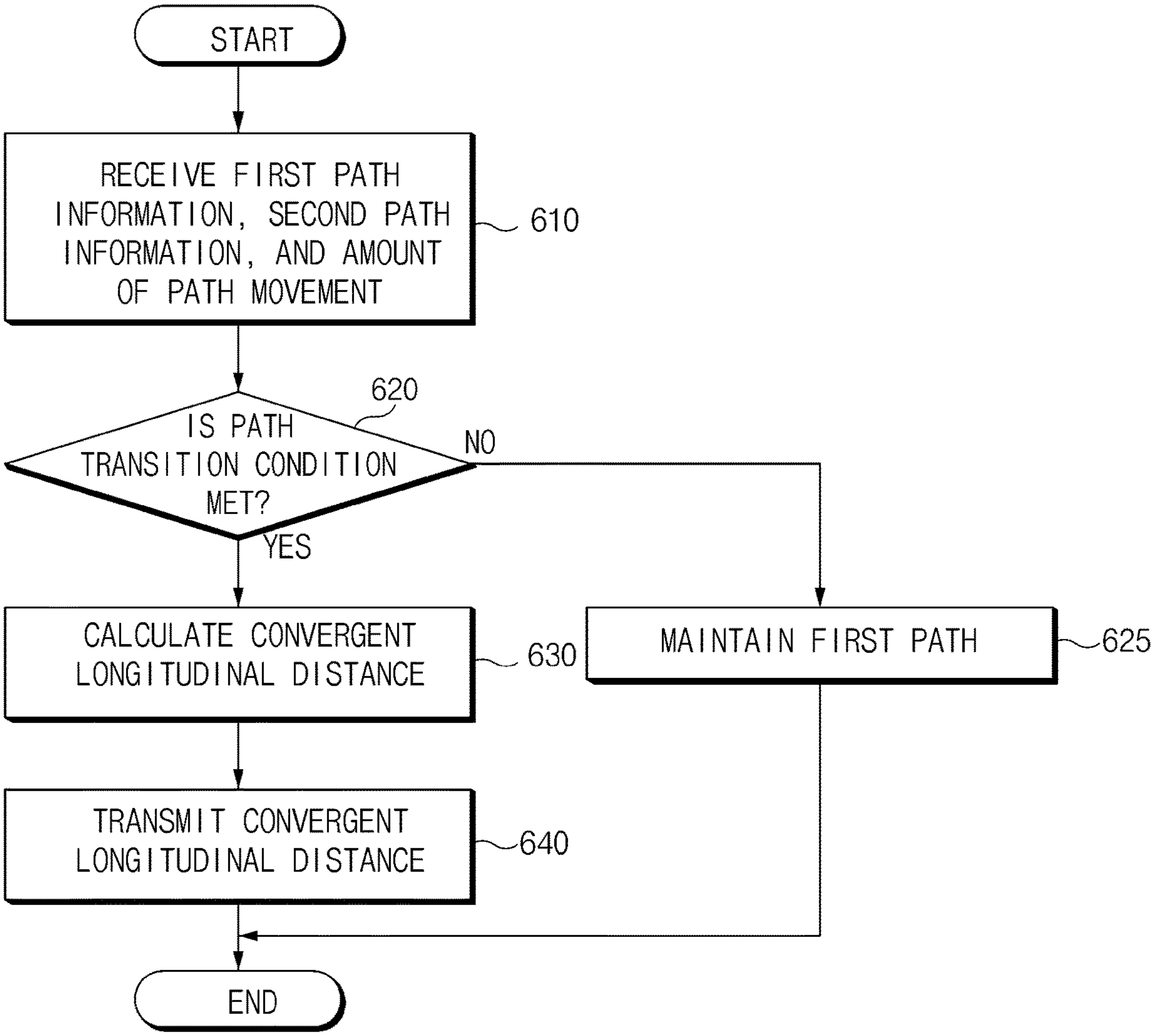
FIG. 6 shows an example of an operation of a path transition determination device according to an example.

FIG. 6 shows an example of an operation of a path transition determination device according to an example.

Referring to FIGS. 2 and 6, in operation 610, a path transition determination device 230 may receive information about a first path (e.g., type information of the first path) and information about a second path (e.g., type information of the second path) from a first input device 210. The path transition determination device 230 may receive an amount of path movement (or a maximum amount of movement) from a second input device 220.

In operation 620, the path transition determination device 230 may identify a path transition condition. The path transition condition may be met if the first path and the second path have different types or if the amount of path movement (or the maximum amount of movement) is greater than or equal to a specified reference value (e.g., 0.1 m).

If the path transition condition is not met (operation 620—NO), in operation 625, the path transition determination device 230 may maintain the existing first path.

If the path transition condition is met (operation 620—YES), in operation 630, the path transition determination device 230 may calculate a convergent longitudinal distance for changing from the first path to the second path. The convergent longitudinal distance may be determined as a level where a passenger does not feel uncomfortable in the path transition process. According to an example, the path transition determination device 230 may calculate a convergence time according to the amount of path movement to determine the convergent longitudinal distance.

In operation 640, the path transition determination device 230 may transmit the calculated convergent longitudinal distance to a transition path generator 240. The transition path generator 240 may generate a transition path between the first path and the second path based on the determined convergent longitudinal distance.

Figure 7:
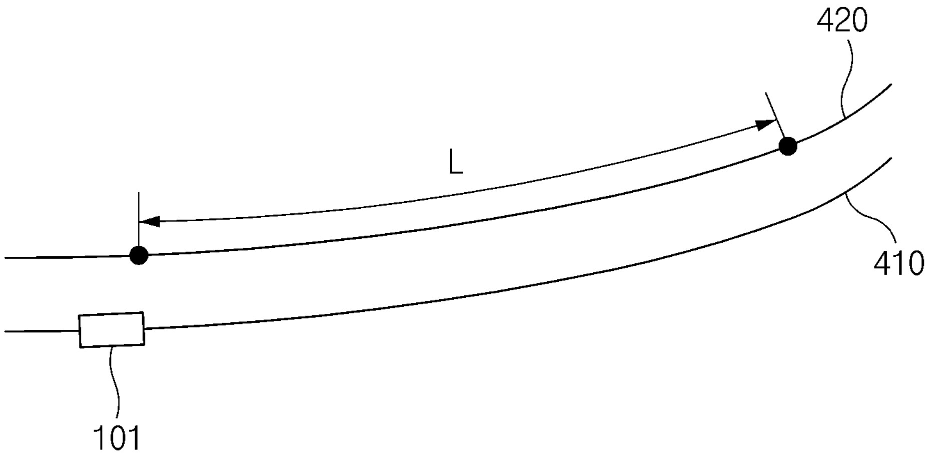
FIG. 7 shows an example of a convergent longitudinal distance according to an example.

FIG. 7 shows an example of a convergent longitudinal distance according to an example.

Referring to FIG. 7, if a path transition condition is met, a path transition determination device 230 may determine a convergent longitudinal distance L, using an amount of path movement (or a maximum amount of movement). The convergent longitudinal distance may be determined as a level where a passenger does not feel uncomfortable, if the path is transitioned.

For example, the convergent longitudinal distance may be determined as Equation 1 below by reflecting the amount of path movement (or the maximum amount of movement).

$$\text{Convergent longitudinal distance} = 3\sqrt{10n} \times Vs \qquad \text{[Equation 1]}$$

n: the amount of path movement (or the maximum amount of movement)

Vs: the longitudinal speed of the vehicle apparatus

A transition path connecting between a first path 410 and a second path 420 may be generated based on the convergent longitudinal distance. A vehicle apparatus 101 may drive along the transition path within the convergent longitudinal distance to change an autonomous driving path from the first path 410 to the second path 420. Additional information about the calculation of the convergent longitudinal distance will be provided with reference to FIG. 8.

Figure 8:
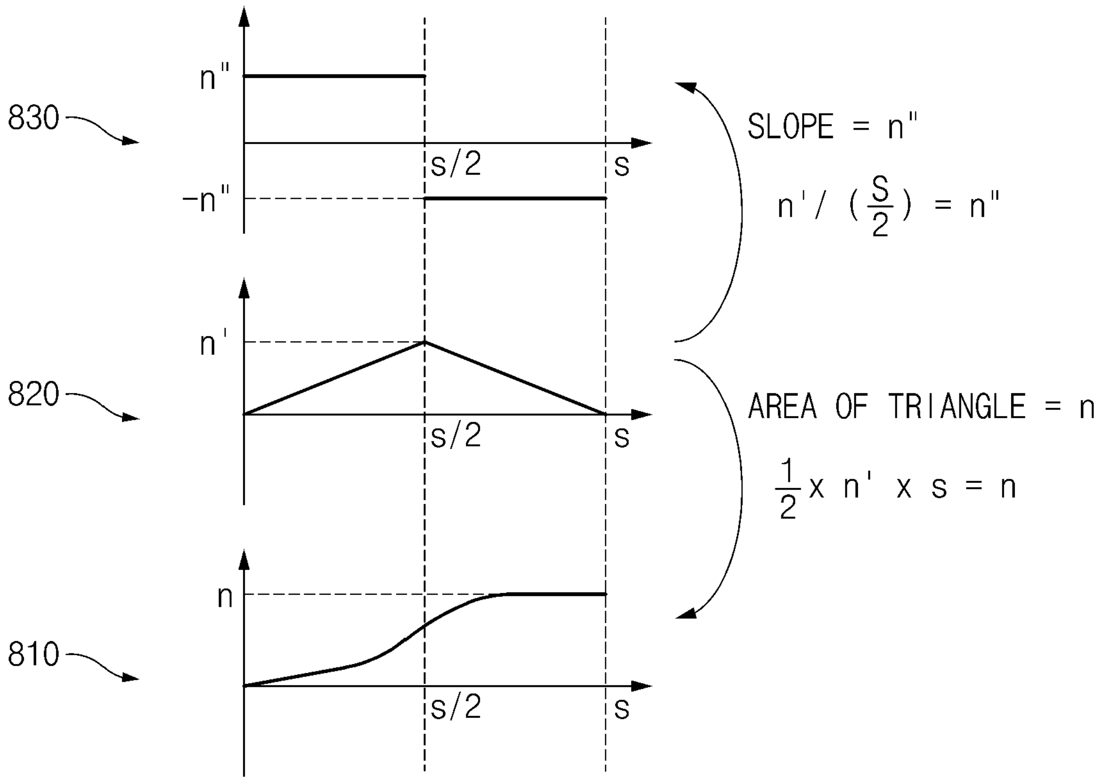
FIG. 8 shows an example of calculating a convergent longitudinal distance according to an example.

FIG. 8 shows an example of calculating a convergent longitudinal distance according to an example.

Referring to FIG. 8, if a path transition condition is met, a path transition determination device 230 may calculate a convergent longitudinal distance for changing from a first path to a second path. The path transition condition may be met if the first path and the second path have different types or if the amount of path movement (or the maximum amount of movement) is greater than a reference value.

A level of discomfort or uneasiness a person feels in a path change process may be proportional to lateral acceleration an received by a vehicle apparatus 101. If desired lateral acceleration $a_{n,desire}$ is maintained as a specified value or less in a path transition process, the discomfort the person feels may decrease. Assuming equal velocity in the path transition process, a value of curvature $n''_{desire}$ when using the desired lateral acceleration $a_{n,desire}$ at a current longitudinal speed $V_s$ of the vehicle may be derived as Equation 2 below.

$$n''_{desire} = \frac{a_{n,desire}}{Vs^2} \qquad \text{[Equation 2]}$$

A transition path (or a connection path) connecting between the first path and the second path should continuously connect between the first path and the second path without discomfort. Thus, a value of the amount n' of change (on a second graph 820) in the amount n of path movement (on a first graph 810) may be set to "0" at a start point of a path change and an end point of the path change. To reduce a calculation time, a certain curvature n" may be calculated assuming a simple bang-bang form which is inverted (refer to a third graph 830).

A curvature n" which is a slope on a graph (or a second graph 820) of n' may be derived as follows.

$$n' \div \frac{s}{2} = n'' \qquad \text{[Equation 3]}$$

Thus, n" may be derived as follows.

$$n'' = \frac{2n'}{s} \qquad \text{[Equation 4]}$$

An area on the graph (or the second graph 820) of n' may be derived as follows.

$$\frac{1}{2} \times n' \times s = n \qquad \text{[Equation 5]}$$

Thus, n' may be derived as follows.

$$n' = \frac{2n}{s} \qquad \text{[Equation 6]}$$

When Equation 6 above is reflected in Equation 4 above, the curvature n" may be expressed as a formula about the amount n of path movement and a longitudinal distance s.

$$n'' = \frac{4n}{s^2} \qquad \text{[Equation 7]}$$

When Equation 7 above is compared with Equation 2 above, the desired lateral acceleration $a_{n,desire}$ and the amount n of path movement may have the following relationship.

$$s^2 = \frac{4n}{a_{n,desire}} \times Vs^2 \qquad \text{[Equation 8]}$$

$$t = 2\sqrt{\frac{n}{a_{n,desire}}} \times Vs \qquad \text{[Equation 9]}$$

A convergence time t for driving along a transition path at the desired lateral acceleration may be derived as follows.

$$t = 2\sqrt{\frac{n}{a_{n,desire}}} \quad \text{[Equation 10]}$$

According to an autonomous driving-related regulation (e.g., UNECE WP.29 no. 157 (Automated Lane Keeping System)), the desired lateral acceleration value upon lane keeping may be set not to be greater than a specified value (e.g., 1.0 m/s2). If it is reflected, a convergence time t for driving along the transition path at the desired lateral acceleration may be derived as follows.

$$\text{convergence time } t = 2\sqrt{10n} \quad \text{[Equation 11]}$$

Assuming equal velocity of the vehicle apparatus 101 in a path change process, for a calculation time gain, and if a safe margin of 50% is added by reflecting a point where it is assumed that the curvature n" is a curvature in a bang-bang form, the convergence time t may be derived as follows.

$$\text{convergence time } t = 3\sqrt{10n} \quad \text{[Equation 12]}$$

Thus, the convergent longitudinal distance may be derived as follows.

$$\text{Convergent longitudinal distance} = 3\sqrt{10n} \times Vs \quad \text{[Equation 1]}$$

n: the amount of path movement (or the maximum amount of movement)

Vs: the longitudinal speed of the vehicle apparatus

Figure 9:
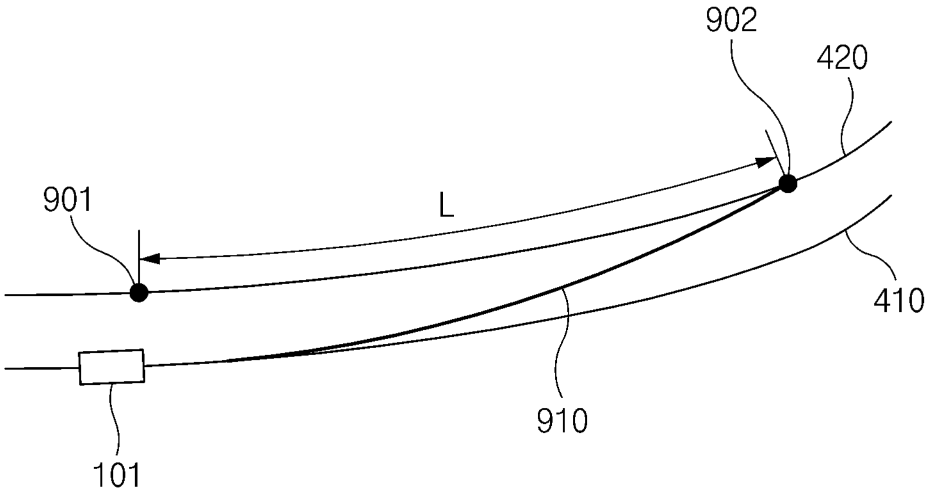
FIG. 9 shows an example of generating a transition path according to an example.

FIG. 9 shows an example of generating a transition path according to an example.

Referring to FIGS. 2 and 9, a transition path generator (or a transition path generation device) 240 may generate a path based on a determined convergent longitudinal distance. The transition path generator 240 may reflect a convergent longitudinal distance L at a current driving point 901 to determine a second point 902. The transition path generator 240 may connect the second point 902 at a currently driving point of the first path 410 to generate a transition path 910. The transition path generator 240 may store information about the transition path 910 in conjunction with the first path 410 and a second path 420.

A vehicle apparatus 101 may drive along the transition path 910. Discomfort a passenger feels may be minimized in the path transition process. If the change in path is completed, the vehicle apparatus 101 may drive along the second path 420.

Figure 10:
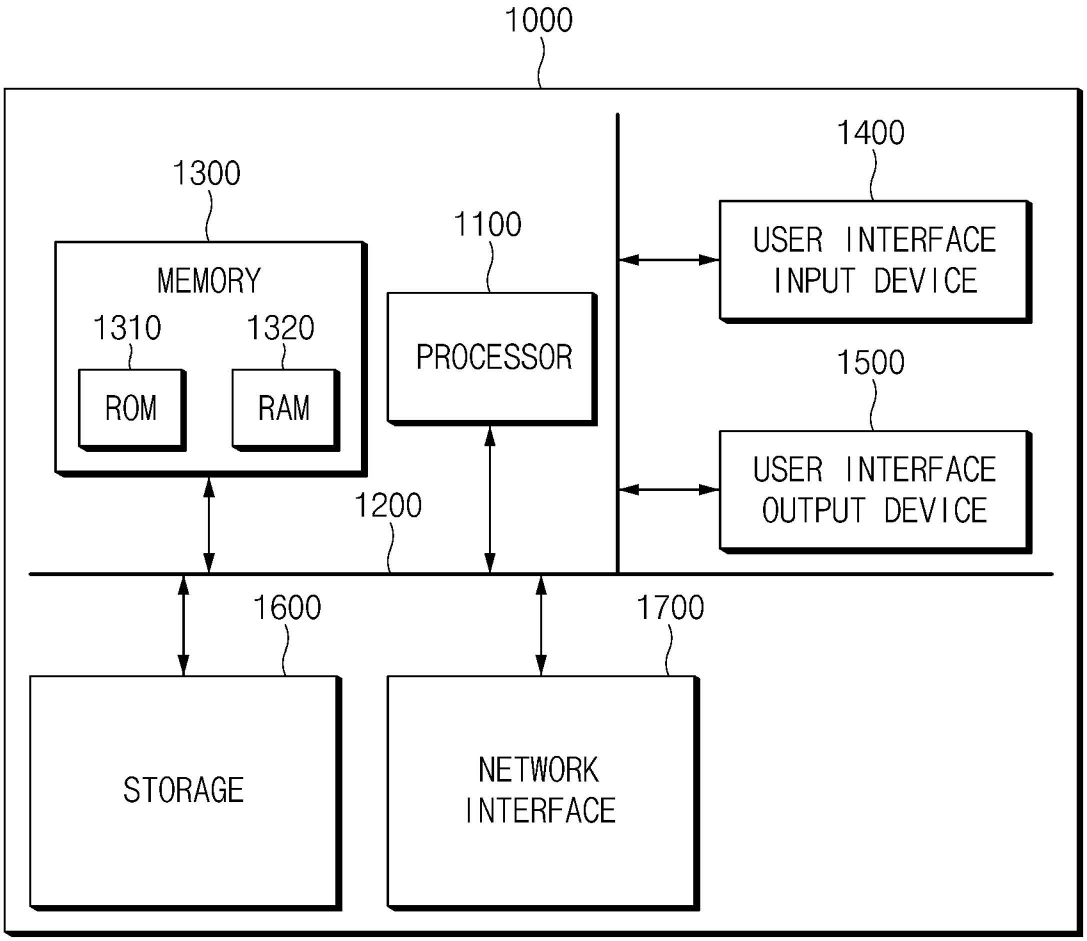
FIG. 10 shows an example of a computing system according to an example of the present disclosure.

FIG. 10 shows an example of a computing system according to an example of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the examples disclosed herein may be embodied directly in hardware or a software module executed by the processor 1100, or in a combination thereof. The software module may reside on a storage medium (e.g., the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively or additionally, the storage medium may be integrated with the processor 1100. The processor and the storage medium may reside in an application specific integrated circuit (ASIC). The ASIC may reside within a passenger terminal. In another case, the processor and the storage medium may reside in the user terminal as separate components.

An example of the present disclosure provides a vehicle control apparatus for determining whether a path during autonomous driving is to be changed, calculating a suitable convergent longitudinal distance where a passenger does not feel uncomfortable and reflecting the convergent longitudinal distance in a path change process, when changing the path, a vehicle apparatus including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle apparatus may support autonomous driving and may include a vehicle control apparatus. The vehicle control apparatus may determine a second path, in a state where the vehicle apparatus drives along a first path by autonomous driving, may identify a path transition condition, may determine a convergent longitudinal distance for changing from the first path to the second path based on an amount of path movement between the first path and the second path, if the path transition condition is met, may generate a transition path connecting the first path with the second path based on the determined convergent longitudinal distance, and may allow the vehicle apparatus to drive along the transition path.

According to an example, the path transition condition may be met if a type of the first path and a type of the second path are different from each other.

According to an example, the vehicle control apparatus may determine the type of the first path or the type of the second path based on at least one of a high definition map, a forward line, a side line, or a road boundary.

According to an example, the path transition condition may be met if the amount of path movement is greater than or equal to a specified value.

According to an example, the amount of path movement may be a longitudinal distance between the first path and the second path.

According to an example, the vehicle control apparatus may calculate longitudinal distances between the first path and the second path at a plurality of points of the second path and may determine a maximum value among the longitudinal distances as the amount of path movement.

According to an example, the vehicle control apparatus may calculate the longitudinal distances at a first point of the second path, the first point corresponding to a location of the vehicle apparatus on the first path, a second point prior to the first point, and a third point subsequent to the first point.

According to an example, the vehicle control apparatus may calculate a duration of time it takes to change from the first path to the second path based on the amount of path movement and may multiply the time by a longitudinal speed of the vehicle apparatus to determine the convergent longitudinal distance.

According to an example, the vehicle control apparatus may calculate the time if a curvature of the amount of path movement is in a bang-bang form.

According to an example, the vehicle control apparatus may calculate the time if the vehicle apparatus drives at an equal velocity in a path change process.

According to an example, the vehicle control apparatus may reflect lateral acceleration of a specified value or less to calculate the time.

According to an example, the vehicle control apparatus may reflect a margin of a specified rate to calculate the time.

According to an example, the vehicle control apparatus may store information about the transition path in conjunction with the first path and the second path.

According to another example of the present disclosure, a vehicle control apparatus may support autonomous driving of a vehicle apparatus. The vehicle control apparatus may include a path determination device, a path transition determination device, and a transition path generator. the path determination device may determine a first path in a first period and may determine a second path in a second period. The path transition determination device may identify a path transition condition and may determine a convergent longitudinal distance for changing from the first path to the second path based on an amount of path movement between the first path and the second path, if the path transition condition is met. The transition path generator may generate a transition path connecting the first path with the second path based on the determined convergent longitudinal distance.

According to an example, the path transition condition may be met if a type of the first path and a type of the second path are different from each other.

According to an example, the path transition condition may be met if the amount of path movement is greater than or equal to a specified value.

According to an example, the amount of path movement may be a longitudinal distance between the first path and the second path.

According to an example, the path transition determination device may use a maximum value among longitudinal distances between the first path and the second path, the longitudinal distances being calculated at a plurality of points of the second path, as the amount of path movement.

According to another example of the present disclosure, a control method of a vehicle apparatus may include determining a second path, in a state where the vehicle apparatus drives along a first path by autonomous driving, identifying a path transition condition, determining a convergent longitudinal distance for changing from the first path to the second path based on an amount of path movement between the first path and the second path, if the path transition condition is met, generating a transition path connecting the first path with the second path based on the determined convergent longitudinal distance, and allowing the vehicle apparatus to drive along the transition path.

According to an example, the path transition condition may be met if a type of the first path and a type of the second path are different from each other.

According to an example, the path transition condition may be met if the amount of path movement is greater than or equal to a specified value.

According to an example, the control method may further include storing information about the transition path in conjunction with the first path and the second path.

The present technology may determine a convergence time or a convergent longitudinal distance such that a passenger does not feel uncomfortable and may change a driving path, if changing a path during autonomous driving is desirable.

In addition or alternative, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, the examples of the present disclosure are provided to explain the spirit and scope of the present disclosure, but not to limit them, so that the spirit and scope of the present disclosure is not limited by the examples. The scope of the present disclosure should be construed on the basis of the accompanying claims, and all the technical ideas within the scope equivalent to the claims should be included in the scope of the present disclosure.

What is claimed is:

1. A method performed by a processor for autonomous driving of a vehicle, the method comprising:

determining a second path that is different from a first path being used for autonomous driving of the vehicle;

determining whether a path transition condition is met;

based on a determination that the path transition condition is met and based on a first distance between the first path and the second path, determining a convergent longitudinal distance within which a path transition from the first path to the second path is to be completed, wherein the first distance is a maximum distance among distances between the first path and the second path, and wherein the convergent longitudinal distance is determined based on a lateral acceleration during the path transition being lower than or equal to a predetermined value;

generating, based on the determined convergent longitudinal distance, a transition path connecting the first path with the second path;

causing the vehicle to drive autonomously along the transition path;

wherein the method further comprises:

calculating a time required to change from the first path to the second path based on the first distance; and determining the convergent longitudinal distance based on the calculated time.

2. The method of claim 1, further comprising:

storing information about the transition path in conjunction with the first path and the second path; and changing, by using the transition path, an autonomous driving path of the vehicle from the first path to the second path.

3. The method of claim 1, further comprising:

determining a type of the first path or a type of the second path based on at least one of a high definition map, a forward line, a side line, or a road boundary.

4. The method of claim 1, further comprising:

calculating distances between the first path and the second path at a plurality of points of the second path; and determining a maximum value among the calculated distances as the first distance.

5. The method of claim 1, wherein the determining of the convergent longitudinal distance based on the calculated time comprises:

multiplying the time by a longitudinal speed of the vehicle.

6. The method of claim 1, further comprising:

determining the first distance between the first path and the second path by determining a lateral distance between a first point of the first path and a first point of the second path in a lateral direction of the vehicle, wherein the determining of the convergent longitudinal distance comprises identifying, based on the lateral distance and a velocity of the vehicle, a second point of the second path, wherein the convergent longitudinal distance is associated with a distance between the first point of the second path and the second point of the second path, and wherein the transition path is a path segment that connects the first path and the second point of the second path.

7. An apparatus for autonomous driving of a vehicle, the apparatus comprising:

a processor; and memory storing instructions that, when executed by the processor, cause the apparatus to:

determine a second path that is different from a first path being used for autonomous driving of the vehicle;

determine whether a path transition condition is met;

based on a determination that the path transition condition is met and based on a first distance between the first path and the second path, determine a convergent longitudinal distance within which a path transition from the first path to the second path is to be completed, wherein the first distance is a maximum distance among distances between the first path and the second path, and wherein the convergent longitudinal distance is determined based on a lateral acceleration during the path transition being lower than or equal to a predetermined value;

generate, based on the determined convergent longitudinal distance, a transition path connecting the first path with the second path; and cause the vehicle to drive autonomously along the transition path, wherein the instructions, when executed by the processor, cause the apparatus to:

calculate a time required to change from the first path to the second path based on the first distance; and determine the convergent longitudinal distance based on the calculated time.

8. The apparatus of claim 7, wherein the path transition condition is met when a type of the first path and a type of the second path are different from each other.

9. The apparatus of claim 7, wherein the instructions, when executed by the processor, cause the apparatus to determine a type of the first path or a type of the second path based on at least one of a high definition map, a forward line, a side line, or a road boundary.

10. The apparatus of claim 7, wherein the path transition condition is met based on a determination that the first distance is greater than or equal to a value.

11. The apparatus of claim 7, wherein the instructions, when executed by the processor, cause the apparatus to change, by using the transition path, an autonomous driving path of the vehicle from the first path to the second path.

12. The apparatus of claim 7, wherein the instructions, when executed by the processor, cause the apparatus to:

calculate distances between the first path and the second path at a plurality of points of the second path; and determine a maximum value among the calculated distances as the first distance.

13. The apparatus of claim 12, wherein the instructions, when executed by the processor, cause the apparatus to calculate the distances at:

a first point of the second path, wherein the first point is derived from a location of the vehicle on the first path;

a second point prior to the first point; and a third point subsequent to the first point.

14. The apparatus of claim 7, wherein the instructions, when executed by the processor, cause the apparatus to determine the convergent longitudinal distance based on the calculated time by:

multiplying the time by a longitudinal speed of the vehicle.

15. The apparatus of claim 7, wherein the instructions, when executed by the processor, cause the apparatus to:

determine the first distance between the first path and the second path by determining a lateral distance between a first point of the first path and a first point of the second path in a lateral direction of the vehicle; and determine the convergent longitudinal distance by identifying, based on the lateral distance and a velocity of the vehicle, a second point of the second path, wherein the convergent longitudinal distance is associated with a distance between the first point of the second path and the second point of the second path, and wherein the transition path is a path segment that connects the first path and the second point of the second path.

16. The apparatus of claim 7, wherein the instructions, when executed by the processor, cause the apparatus to calculate the time based on a determination that the vehicle moves at a constant velocity in a path change process.

17. The apparatus of claim 7, wherein the instructions, when executed by the processor, cause the apparatus, based on a margin of a specified rate and based on the lateral acceleration of the predetermined value or less, to calculate the time.

18. The apparatus of claim 7, wherein the instructions, when executed by the processor, cause the apparatus to store information about the transition path in conjunction with the first path and the second path.

19. The apparatus of claim 7, wherein the instructions, when executed by the processor, cause the apparatus to:

determine the first path in a first period of time; and determine the second path in a second period of time.

* * * * *